(12) United States Patent
Pickutoski et al.

(10) Patent No.: US 6,527,538 B1
(45) Date of Patent: Mar. 4, 2003

(54) APPARATUS FOR VACUUM ASSISTED VENTING

(75) Inventors: Edward Pickutoski, Olyphant, PA (US); Joseph Bistran, Dickson City, PA (US); Lewis Gensel, Avoca, PA (US); William Mueller, Clarks Summit, PA (US)

(73) Assignee: WEA Manufacturing Inc., Olyphant, PA (US)

( * ) Notice: Subject to any disclaimer, the term of this patent is extended or adjusted under 35 U.S.C. 154(b) by 85 days.

(21) Appl. No.: 09/751,646

(22) Filed: Dec. 29, 2000

Related U.S. Application Data

(60) Provisional application No. 60/199,718, filed on Apr. 26, 2000.

(51) Int. Cl.[7] ............................................. B29C 45/63
(52) U.S. Cl. ................. 425/546; 425/812; 425/DIG. 60
(58) Field of Search ................................ 425/546, 812, 425/DIG. 60

(56) References Cited

FOREIGN PATENT DOCUMENTS

| DE | 20 22 686 | 12/1971 |
|---|---|---|
| GB | 2 030 916 | 4/1980 |
| JP | 03 293107 | 12/1991 |
| JP | 05 342644 | 12/1993 |

*Primary Examiner*—Tim Heitbrink
(74) *Attorney, Agent, or Firm*—Fish & Neave; Robert R. Jackson

(57) ABSTRACT

A method and apparatus for vacuum assisted venting of an injection mold. The apparatus includes a main body structured to be mounted around an outer circumference of the injection mold and configured to facilitate application of a vacuum pressure therein. The method and apparatus are particularly directed towards preventing the accumulation of residual material inside an injection mold and reducing the frequency of disassembly and cleaning required for the injection mold.

8 Claims, 4 Drawing Sheets

APPARATUS FOR VACUUM ASSISTED VENTING

CROSS REFERENCE TO RELATED APPLICATION

This claims the benefit of copending United States Provisional Patent Application No. 60/199,718, filed Apr. 26, 2000, which is hereby incorporated by reference herein in its entirety.

BACKGROUND OF THE INVENTION

The present invention relates generally to a method and apparatus for improving the manufacturing process for injection-molded optical discs such as a CD, CD-R, and a DVD, for example. More particularly, the invention relates to a method and apparatus for vacuum assisted venting of an injection mold used to manufacture optical discs.

Since the introduction of optical disc technology, the industry is experiencing phenomenal growth as the number of optical discs including CDS, CD ROMs and DVDs manufactured world-wide continues to increase. Naturally, such rapid growth has come with an associated set of technical problems relating to the high-volume manufacturing process used in producing optical discs. The sheer number of optical discs produced at many manufacturing plants coupled with the high production quotas have put a premium on optimizing plant equipment. Of particular concern to optical disc manufacturers is minimizing equipment downtime due to maintenance and repair.

The leading manufacturing method for producing optical discs continues to be the standard stamper-injection molding process or some variation of it. During the injection-molding process, a moldable material such as a polycarbonate-based thermoplastic is used to form the disc substrate. The moldable material is liquified by heating to a temperature sufficient to permit uniform flow into the mold cavity.

A certain amount of residual material and vapors are released during this process and it therefore becomes necessary to address its collection and disposal. Typically, the injection mold includes a variety of specially configured gaps or vents to provide an area for the vapors and residual material to collect. To prevent the molding process from being adversely effected, however, it is necessary to regularly clean the injection mold and remove the unwanted residual materials from the injection mold. Cleaning the injection mold is a time consuming and cumbersome process that typically involves substantial disassembly of the mold.

There have been many improvements to the injection molding process directed generally towards reducing equipment downtime due to routine maintenance and repairs. While these solutions have helped the injection molding process become more streamlined and cost-effective, they have not been successful in substantially reducing the need for frequent disassembly and cleaning of the injection mold itself.

As such, there is a need for an innovation in injection molding technology that is oriented towards eliminating the burdensome and time-consuming task of clearing residual material out of the vents in an injection mold.

SUMMARY OF THE INVENTION

The present invention provides a method and apparatus for vacuum assisted venting of an injection mold that is designed to satisfy all of the aforementioned needs. It is particularly directed towards preventing the accumulation of residual material inside an injection mold and eliminates the need for the time-consuming and difficult task of disassembling the injection mold and removing accumulated residual material.

It is an object of this invention to provide a method and apparatus structured to minimize downtime in optical disc manufacturing equipment by eliminating the need to periodically disassemble an injection mold for purposes of clearing and removing accumulated residual material.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENT

In order that the invention herein described may be fully understood, the following detailed description is set forth with reference to FIGS. 1–9.

Figure 1:
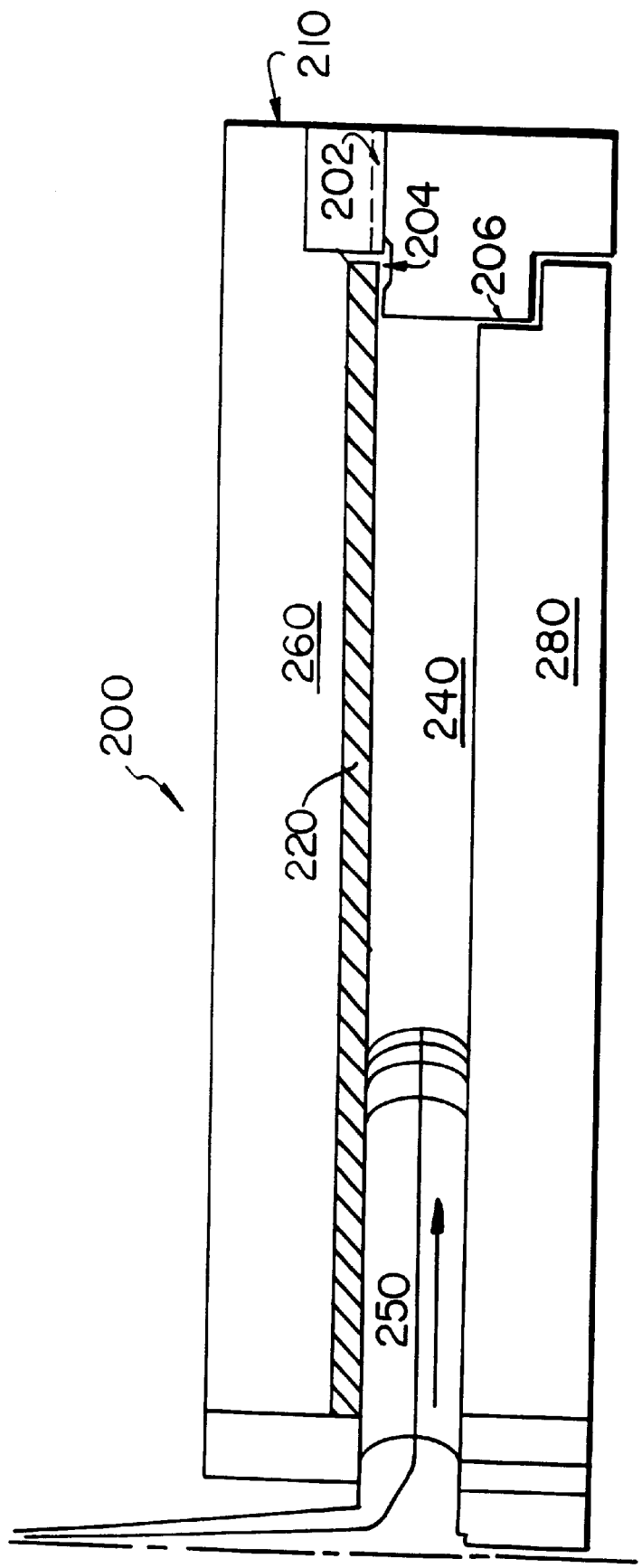
FIG. 1 is a partial cross-sectional view of an illustrative injection mold before the apparatus for vacuum assisted venting is secured (FIG. 1 shows a representative radial section of the mold, with the center of the mold on the left and the radially outer-most part on the right)

The present invention is configured for use with typical manufacturing equipment for the production of optical discs such as used with the stamper injection molding process or variations of it. A typical injection mold, as shown in representative part in FIG. 1, includes a disc-shaped cavity 240 sandwiched between a stamper 220, a top plate 260, and a bottom plate 280, generally configured as shown. A moldable material 250 such as a polycarbonate-based thermoplastic is commonly used to form the disc substrate. The moldable material 250 is liquified by heating to a temperature sufficient to permit uniform flow into the disc-shaped cavity 240 as shown. The liquified moldable material is forced into the center of the mold (on the left in FIG. 1) and flows radially out in all directions to completely fill cavity 240. Unfortunately, a certain amount of residual material and vapors are released during the injection molding process. In order to release the residual material and prevent interference with the disc substrate, a variety of specially configured gaps or vents 202, 204, 206 are provided in the injection mold 200 as shown in FIG. 1. For example, gaps or vents 202, 204, 206 preferably extend annularly all the way around the injection mold or are at least disposed at several spaced locations annularly around the mold. Gap or vent 206 is also the "parting line" of the mold (i.e., the line along which mold part 280 separates from the remainder of the mold to allow each successive disc produced in the mold to be removed from the mold). The apparatus for vacuum assisted venting of the present invention is configured to surround an outer circumference 210 of the injection mold 200, as will be described in greater detail below, and prevent or at least reduce the accumulation of residual material within the vents 202, 204, and 206.

The method of vacuum assisted venting of an injection mold initially requires that vents in an injection mold are identified. Generally, as shown in FIG. 1, vents 202, 204 are disposed around an outer circumference 210 of an injection mold 200. However, it will be appreciated by those skilled in the art that some injection mold configurations may have vent locations considerably different from those shown. The method of vacuum assisted venting of the present invention is designed for use with a variety of different injection mold configurations. In the preferred embodiment, after the vents are identified, at least some of them are surrounded in an enclosed area. Finally, a vacuum is applied to the enclosed area during the molding process in order to prevent or at least reduce the accumulation of residual material in or on the vents of the injection mold. The enclosed area may be configured in a wide variety of ways without departing from the method of the present invention.

Figure 2:
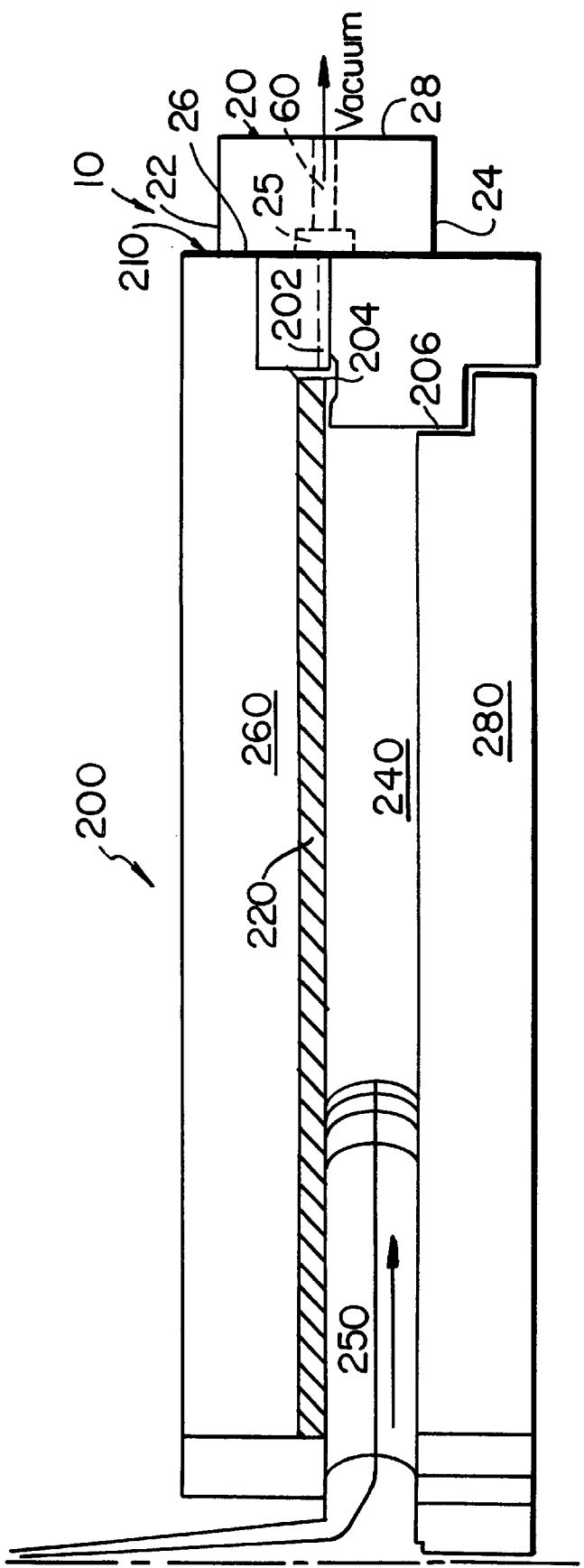
FIG. 2 is a partial cross-sectional view of the injection mold of FIG. 1 shown with illustrative apparatus for vacuum assisted venting in place.
Figure 5:
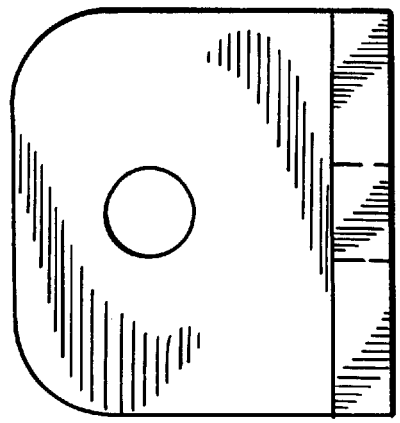
FIG. 5 is a front view of the mounting bracket of FIGS. 3 and 4.
Figure 3:
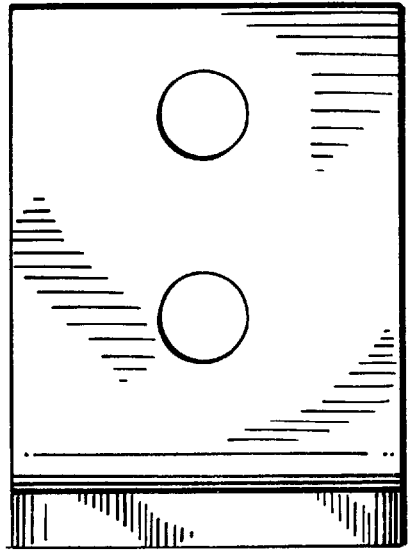
FIG. 3 is a top view of an illustrative mounting bracket for use with the depicted apparatus for vacuum assisted venting.
Figure 4:
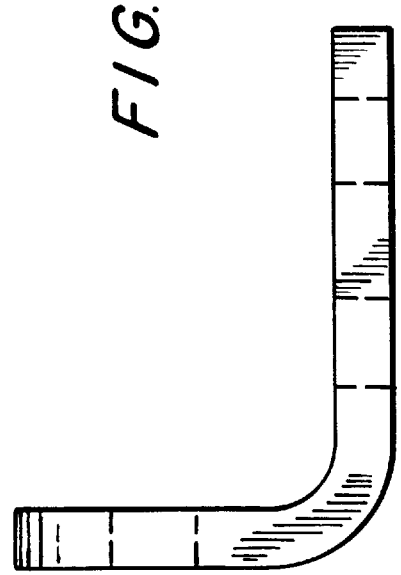
FIG. 4 is a side view of the mounting bracket of FIG. 3.
Figure 6:
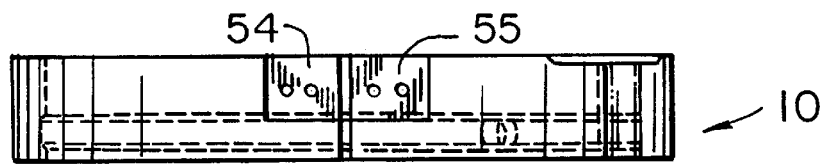
FIG. 6 is a side view of illustrative apparatus for vacuum assisted venting in accordance with the present invention taken along the line 6—6 in FIG. 7.
Figure 7:
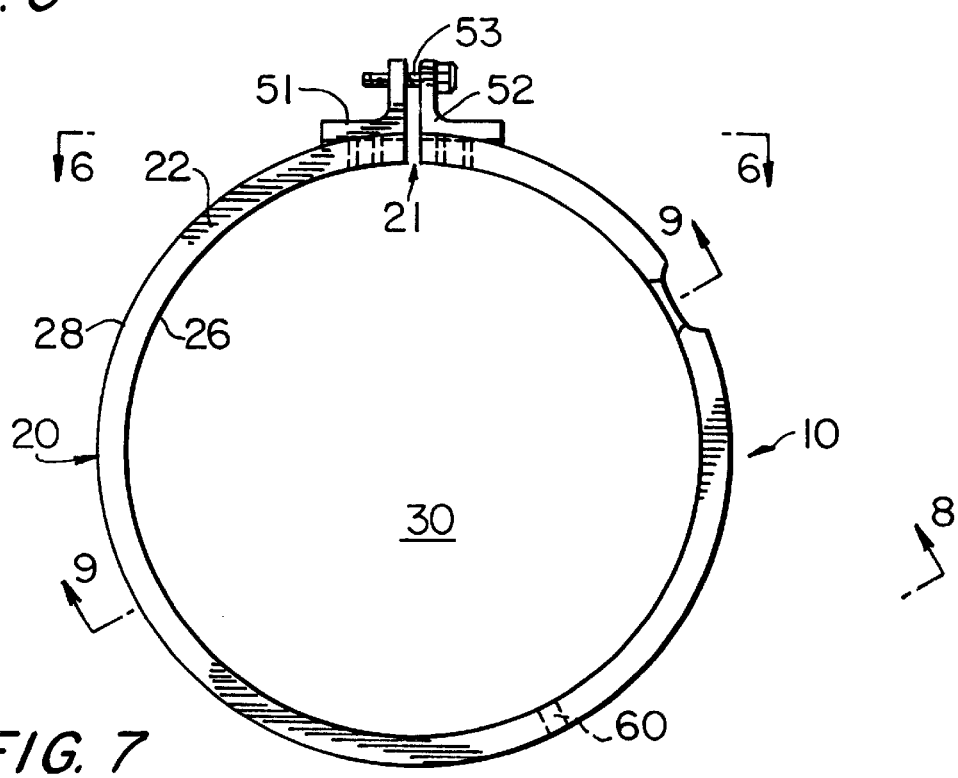
FIG. 7 is a plan view of the apparatus of FIG. 6.

Illustrative apparatus for vacuum assisted venting 10 in accordance with the present invention is generally shown in FIGS. 2, and 6–9. As best shown in FIG. 7, apparatus 10 includes a main body 20 defining a circular opening 30 therein. As shown in FIGS. 6–9, apparatus 10 includes a top surface 22, a bottom surface 24, an inner surface 26, and an outer surface 28. Apparatus 10 is configured to be mounted around at least a substantial portion of an outer circumference 210 of an injection mold 200 as best shown in FIG. 2. It will be understood by those skilled in the art that apparatus 10 can be manufactured from a wide variety of known materials (e.g., steel, structural plastic, or the like) without departing from the present invention.

In the preferred embodiment, the inside diameter of the main body 20 of apparatus 10 is adjustable to facilitate easier placement of apparatus 10 around the outer circumference 210 of injection mold 200. This can be accomplished in a number of different ways. In the preferred embodiment, main body 20 includes an adjustable opening 21 as shown in FIG. 7. By including an adjustable opening 21, it is seen that the inside diameter of main body 20 may easily be adjusted by changing the width of adjustable opening 21. The width of adjustable opening 21 may be changed in a number of ways. In one embodiment, first and second mounting brackets 51, 52 may be used similar to those shown in FIGS. 3–5. Preferably, mounting brackets 51, 52 are secured to main body 20 in a spaced-apart manner as shown in FIG. 7 and interconnected with a fastener 53. As is apparent in FIG. 7, opening 21 in main body 20 may be adjusted by tightening or loosening fastener 53. It will be appreciated by those skilled in the art that mounting brackets 51, 52 may be secured to main body 20 in a wide variety of ways. In one embodiment, main body 20 includes a recessed cavity 54, 55 to facilitate securing of mounting brackets 51, 52 by way of known fasteners.

As shown in FIG. 1, the typical injection mold 200 is designed with a variety of specially configured gaps or vents 202, 204, 206 to provide areas for vapors and residual material to escape during the injection molding process. In the preferred embodiment of the present invention, main body 20 is structured to abut the outer circumference 210 of injection mold 200 as best shown in FIG. 2. As shown in FIG. 2, the inner surface 26 of main body 20 includes a recessed channel disposed circumferentially therein. Recessed channel 25 is configured to be aligned with vents 202, 204 in the injection mold 200 so as to facilitate the application of a vacuum pressure therein. Although apparatus 10 does not directly operate on gap 206, it even helps keep gap 206 clear by increasing the amount, fraction, or proportion of the unwanted material that exits via gaps 202 and 204. (Gap 206 should not be in any way obstructed by apparatus 10, because gap 206 is the parting line of the mold which must open at the completion of each molding cycle to allow each successive disc to be removed from the mold.)

Figure 8:
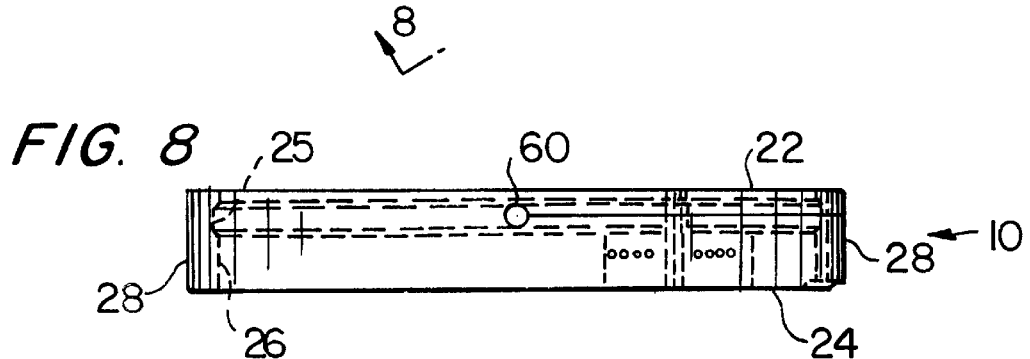
FIG. 8 is a side view taken along the line 8—8 in FIG. 7.
Figure 9:
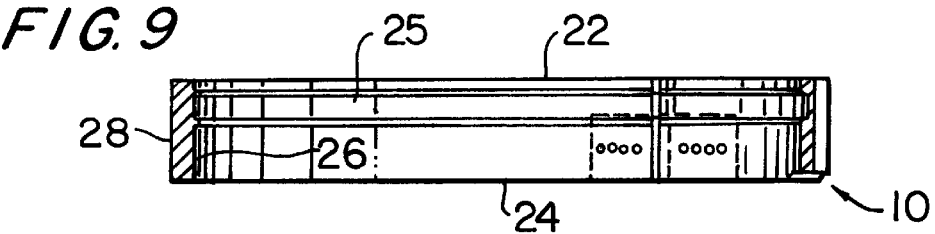
FIG. 9 is a cross-sectional view taken along the line 9—9 in FIG. 7.

The main body 20 of the preferred embodiment includes at least one venting outlet 60 as shown in FIGS. 2, 6, and 8. It will be appreciated that a wide variety of configurations may be utilized for venting outlet 60 without departing from the present invention. It is important, however, that venting outlet 60 is structured to facilitate application of a vacuum pressure on vents 202 and 204. In the preferred embodiment as shown in FIGS. 2, 6, and 8, venting outlet 60 is configured as a passageway extending from recessed channel 25 of the inner surface 26 of main body 20 to the outer surface 28 of main body 20. It will be appreciated by those skilled in the art that a vacuum source may be matingly connected to venting outlet 60 to permit vacuum pressure to be exerted on vents 202 and 204 of injection mold 200. As such, it is seen that the present invention prevents or at least reduces the accumulation of residual material in or on vents 202 and 204 of the injection mold and thereby substantially reduces the frequency at which the injection mold needs to be disassembled and cleaned. In this regard, it will be appreciated that a novel method and apparatus for vacuum assisted venting has been provided that fulfills the needs previously unmet by the prior art. One skilled in the art will appreciate that this invention can be practiced by other than the described embodiments, which are presented for purposes of illustration and not of limitation, and this invention is therefore limited only by the claims which follow.

We claim:

1. An apparatus for vacuum assisted venting of an injection mold, comprising:
   a main body structured to be mounted around a portion of an outer circumference of the injection mold;
   said main body defining a generally circular opening therein and including a top surface, a bottom surface, an inner surface, and an outer surface;
   said inner surface of said main body substantially abutting said outer circumference of said injection mold; and
   said main body structured and disposed to facilitate application of a vacuum pressure upon a number of vents contained within said injection mold.

2. The apparatus of claim 1 wherein said main body includes at least one venting outlet disposed therein.

3. The apparatus of claim 2, wherein said inner surface of said main body includes a recessed channel disposed circumferentially therein and aligned to correspond with said number of vents disposed within said injection mold.

4. The apparatus of claim 3, wherein said venting outlet extends from said outer surface of said main body to said recessed channel of said inner surface of said main body.

5. The apparatus of claim 1 wherein said main body includes an adjustable opening therein structured to facilitate adjustment of an inside diameter of said main body.

6. The apparatus of claim 5, further comprising:
a pair of mounting brackets secured to said main body;
said mounting brackets positioned in a spaced-apart manner on said main body; and
a fastener adjustably connecting said mounting brackets such that adjusting said fastener results in movement of said mounting brackets and a corresponding adjustment of said inside diameter of said main body.

7. The apparatus of claim 6 wherein said main body includes a pair of recessed cavities structured to receive said pair of mounting brackets.

8. An apparatus for vacuum assisted venting of an injection mold, comprising:
a main body structured to be mounted around a portion of an outer circumference of the injection mold;
said main body defining a generally circular opening therein and including a top surface, a bottom surface, an inner surface, and an outer surface;
said inner surface of said main body substantially abutting said outer circumference of said injection mold;
said inner surface of said main body including a recessed channel disposed circumferentially therein and aligned to correspond with a number of vents disposed within said injection mold;
said main body including at least one venting outlet disposed therein; and
said venting outlet structured and disposed to extend from said outer surface of said main body to said recessed channel of said inner surface and configured to facilitate application of a vacuum pressure upon a number of vents contained within said injection mold.

* * * * *